US009568767B2

(12) United States Patent
Nam et al.

(10) Patent No.: US 9,568,767 B2
(45) Date of Patent: Feb. 14, 2017

(54) DISPLAY APPARATUS

(71) Applicant: Samsung Display Co., Ltd., Yongin (KR)

(72) Inventors: Jung Gun Nam, Seoul (KR); Moonjung An, Seoul (KR); Dae-Young Lee, Seoul (KR); Daehwan Jang, Gwangmyeong-si (KR); Gugrae Jo, Asan-si (KR); Takakuwa Atsushi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 14/198,106

(22) Filed: Mar. 5, 2014

(65) Prior Publication Data

US 2015/0062497 A1 Mar. 5, 2015

(30) Foreign Application Priority Data

Sep. 4, 2013 (KR) .......................... 10-2013-0106233

(51) Int. Cl.
*G02F 1/1335* (2006.01)
*G02F 1/1333* (2006.01)

(52) U.S. Cl.
CPC ... *G02F 1/133536* (2013.01); *G02F 1/133345* (2013.01); *G02F 1/133555* (2013.01); *G02F 2001/133548* (2013.01); *G02F 2001/133562* (2013.01); *G02F 2201/38* (2013.01)

(58) Field of Classification Search
CPC .................. G02F 1/133536; G02F 1/133555; G02F 1/133345; G02F 2001/133548; G02F 2001/133562; G02F 2201/38

USPC ..................................................... 349/96–98
See application file for complete search history.

(56) References Cited

U.S. PATENT DOCUMENTS

| 6,288,840 | B1 | 9/2001 | Perkins et al. |
| 7,113,335 | B2 | 9/2006 | Sales |
| 7,233,563 | B2 | 6/2007 | Ueki et al. |
| 7,639,414 | B2 | 12/2009 | Hwang et al. |
| 7,961,393 | B2 | 6/2011 | Perkins et al. |
| 7,965,357 | B2 | 6/2011 | Van De Witte et al. |
| 8,049,841 | B2 | 11/2011 | Sugita et al. |
| 2004/0264350 | A1* | 12/2004 | Ueki .................. G02B 5/3058 369/112.16 |
| 2007/0242352 | A1 | 10/2007 | MacMaster |

(Continued)

FOREIGN PATENT DOCUMENTS

| JP | 2009-186929 | 8/2009 |
| JP | 2012-098703 | 5/2012 |

(Continued)

*Primary Examiner* — Charles Chang
(74) *Attorney, Agent, or Firm* — H.C. Park & Associates, PLC

(57) ABSTRACT

A display apparatus may include a backlight assembly configured to generate an emitted light and a display panel configured to receive the emitted light to display images. The display panel may include a display substrate, an opposite substrate facing the display substrate, a wire grid polarizer, and a reflection reducing layer. The wire grid polarizer may be disposed on at least one of the display substrate and the opposite substrate to polarize the emitted light. The reflection reducing layer may have a grid shape and may be disposed on the wire grid polarizer. The reflection reducing layer may reduce an amount of a light reflected by the wire grid polarizer.

17 Claims, 8 Drawing Sheets

(56) References Cited

U.S. PATENT DOCUMENTS

| | | | |
|---|---|---|---|
| 2007/0285598 A1* | 12/2007 | Hwang | G02F 1/133528 349/96 |
| 2008/0316599 A1 | 12/2008 | Wang et al. | |
| 2009/0052030 A1 | 2/2009 | Kaida et al. | |
| 2011/0037928 A1 | 2/2011 | Little | |
| 2011/0285942 A1 | 11/2011 | Guo et al. | |
| 2014/0354923 A1 | 12/2014 | Lee et al. | |

FOREIGN PATENT DOCUMENTS

| | | |
|---|---|---|
| JP | 2012-181420 | 9/2012 |
| KR | 10-2014-0140181 | 12/2014 |

* cited by examiner

DISPLAY APPARATUS

CROSS REFERENCE TO RELATED APPLICATION

This application claims priority from and the benefit of Korean Patent Application No. 10-2013-0106233, filed on Sep. 4, 2013, which is hereby incorporated by reference for all purposes as if fully set forth herein.

BACKGROUND

Field

Exemplary embodiments of the present disclosure relate to a display apparatus having a wire grid polarizer.

Discussion of the Background

A display apparatus having a liquid crystal display panel, which is not self-emissive, may include a backlight assembly to generate light. The liquid crystal display panel may display an image using the light provided from the backlight assembly.

The liquid crystal display panel may include a display substrate on which pixels are formed, an opposite substrate facing the display substrate, a liquid crystal layer interposed between the display substrate and the opposite substrate, and polarizing plates respectively disposed on front and rear surfaces of the liquid crystal display panel. The display substrate may include signal lines electrically connected to the pixels to transmit various signals to the pixels and thin film transistors electrically connected to the pixels and the signal lines.

Polarizing plates may be realized by a wire grid polarizer formed of metal wires, which is different from a film type polarizing plate. An external light may be reflected by the wire grid polarizer and may be perceived by a user. Thus, the light may add noise in an image displayed on the display panel.

The above information disclosed in this Background section is provided to enhance understanding of the background of the disclosed subject matter and therefore may contain information that does not form any part of the prior art nor what the prior art may suggest to a person of ordinary skill in the art.

SUMMARY

Exemplary embodiments of the present disclosure provide a display apparatus having an improved display quality.

Additional features of the present disclosure will be set forth in the description which follows, and in part will be apparent from the description, or may be learned by practice of the disclosed subject matter.

Exemplary embodiments of the present disclosure disclose a display apparatus including a backlight assembly configured to emit light and a display panel configured to receive the emitted light to display an image. The display panel includes a display substrate, an opposite substrate facing the display substrate, a wire grid polarizer, and a reflection reducing layer. The wire grid polarizer is disposed on at least one of the display substrate and the opposite substrate to polarize the emitted light. The reflection reducing layer has a grid shape and is disposed on the wire grid polarizer to reduce an amount of a reflected light. The reflecting light is generated in response to an external light being reflected by the wire grid polarizer.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
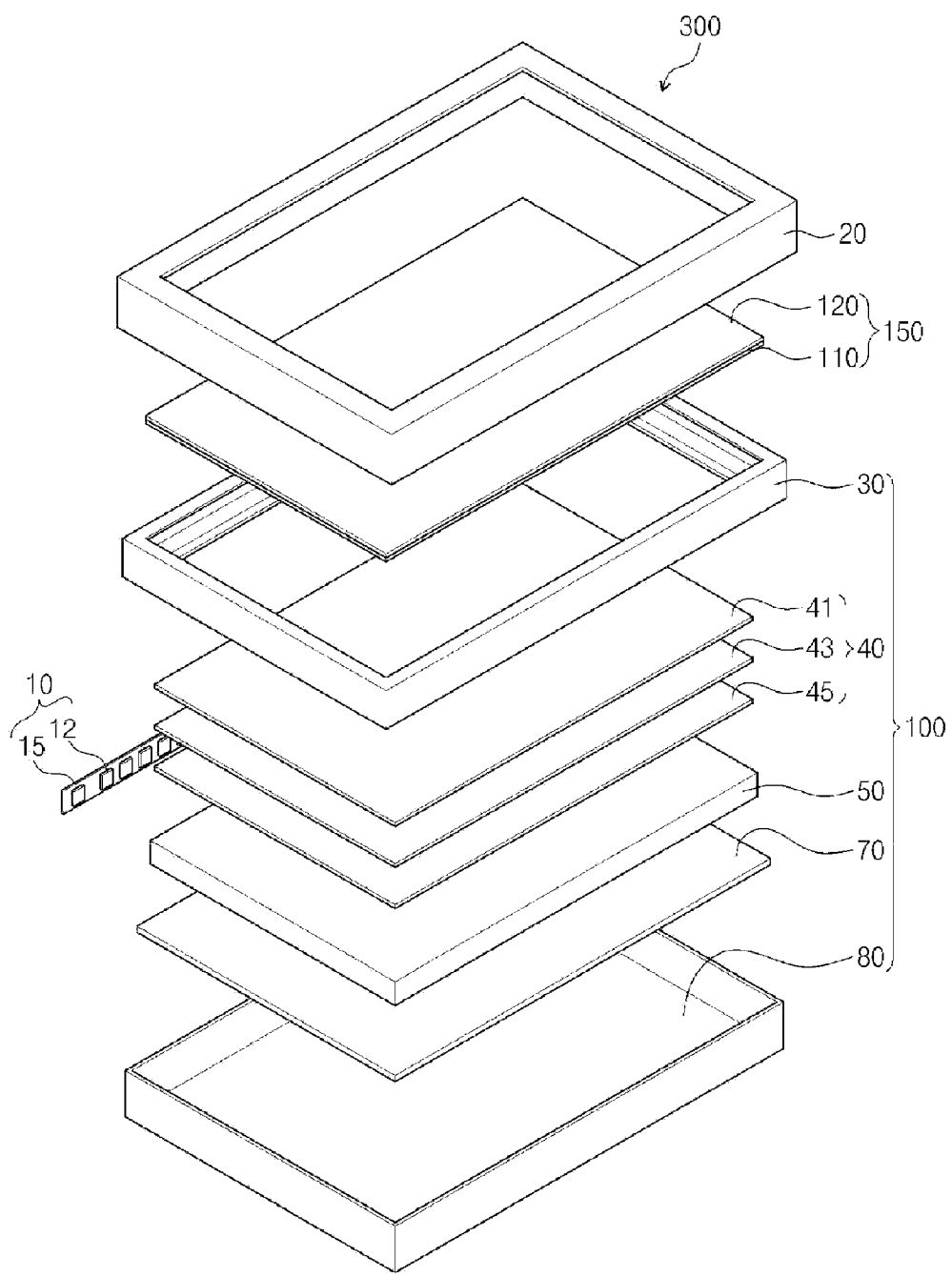
FIG. 1 is an exploded perspective view showing a display apparatus according to exemplary embodiments of the present disclosure.

The disclosed subject matter is described more fully hereinafter with reference to the accompanying drawings, in which exemplary embodiments of the disclosed subject matter are shown. This disclosed subject matter may, however, be embodied in many different forms and should not be construed as limited to the exemplary embodiments set forth herein. Rather, these exemplary embodiments are provided so that this disclosure is thorough, and will fully convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be explained in detail with reference to the accompanying drawings.

Figure 2:
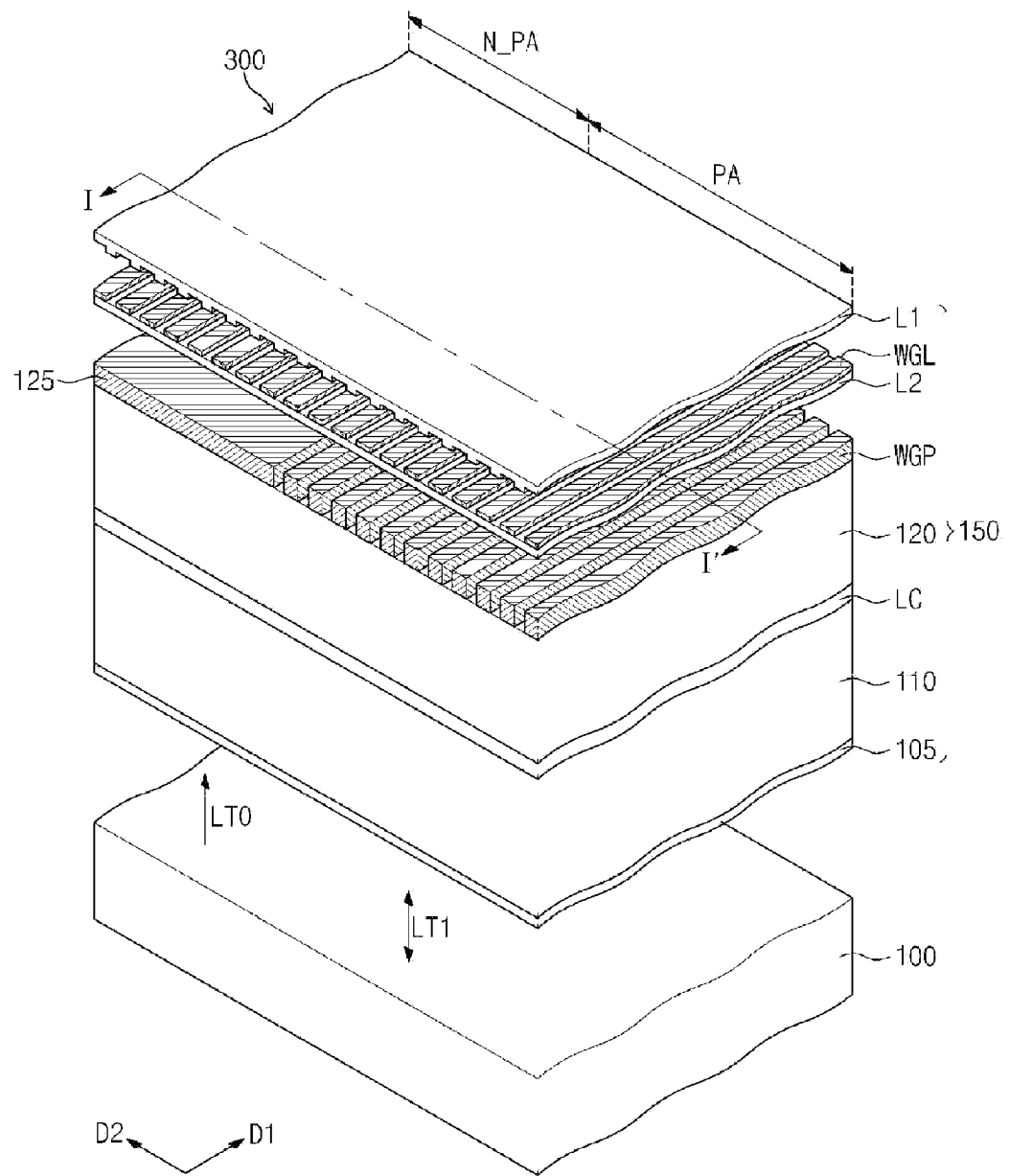
FIG. 2 is an enlarged perspective view showing a portion of a display panel and a backlight assembly of FIG. 1 according to exemplary embodiments of the present disclosure.

FIG. 1 is an exploded perspective view showing a display apparatus 300 according to exemplary embodiments of the present disclosure, and FIG. 2 is an enlarged perspective view showing a portion of a display panel 150 and a backlight assembly 100 of FIG. 1.

Referring to FIGS. 1 and 2, a display apparatus 300 may include various suitable types of display devices. For example, the display apparatus 300 be a liquid crystal display, and may include a backlight assembly 100 and a display panel 150. In some cases, the display apparatus 300 may be another type of display apparatus, e.g., a nanocrystal display, which includes the backlight assembly 100 as its light source, and the display apparatus 300 may be an organic electroluminescent display.

The display panel 150 shown in FIGS. 1 and 2 may include a display substrate 110, an opposite substrate 120, a liquid crystal layer LC, a polarizing plate 105, a wire grid polarizer WGP, a reflection layer 125, and a reflection reducing layer WGL. The opposite substrate 120 may be disposed to face the display substrate 110, and the liquid crystal layer LC may be interposed between the display substrate 110 and the opposite substrate 120.

The polarizing plate 105 may be disposed under the display substrate 110 to polarize an emitted light LT0 provided by the backlight assembly 100. The polarizing plate 105 may have a shape of a film attached to the display substrate 110, and the polarizing plate 105 may comprise a polarizing film including polyvinyl alcohol (PVA). The opposite substrate 120 may be disposed farther from the backlight assembly 100 than the display substrate 110. The wire grid polarizer WGP and the reflection reducing layer WGL may be disposed on the opposite substrate 120. Thus, the emitted light LT0 may exit the display panel 150 after consecutively passing through the polarizing plate 105, the display substrate 110, the opposite substrate 120, and the wire grid polarizer WGP, and thus the image may be displayed on the display panel 150.

The backlight assembly 100 may emit the emitted light LT0 to the display panel 150. A structure of the backlight assembly 100 is not limited to the structure illustrated in FIGS. 1 and 2, and may be variously implemented. One implementation of the backlight assembly 100 is described hereinbelow.

The backlight assembly 100 may include a receiving container 80, a light emitting unit 10, a reflection member 70, a light guide plate 50, a mold frame 30, a plurality of sheets 40, and a cover member 20.

The receiving container 80 includes a bottom portion and a plurality of sidewalls extending from the bottom portion to provide a containing space. A light emitting unit 10 is accommodated in the containing space and may generate a light used as a source of the emitted light LT0. The light emitting unit 10 may include a printed circuit board 15 and a plurality of light emitting diode packages 12 mounted on the printed circuit board 15 to emit the light. The light emitting unit 10 may be disposed to face one side surface of a light guide plate 50. Light generated from the light emitting diode packages 12 may be incident to the light guide plate 50 through the one side surface of the light guide plate 50.

The light guide plate 50 may be accommodated in the containing space of the receiving container 80. The light guide plate 50 may receive light generated from the light emitting unit 10 and may guide the light to the display panel 150 using light guide patterns (not shown) having a concavo-convex shape and being disposed on a rear surface of the light guide plate 50.

The reflection member 70 may include a light reflection material, such as aluminum, and may be disposed between the bottom portion of the receiving container 80 and the light guide plate 50. Light that reaches the reflection member 70 in the receiving container 80 after being reflected by the wire grid polarizer WGP and the reflection layer 125 may be reflected by the reflection member 70 and provided to the light guide plate 50.

Sheets 40 may be disposed between the light guide plate 50 and the display panel 150. The sheets 40 may include a protection sheet 41, a prism sheet 43, and a diffusion sheet 45. The protection sheet 41 may be provided with a non-optical property to protect a rear surface of the display panel 150. The prism sheet 43 may condense light exiting from the light guide plate 50 to enhance a front brightness of the display panel 150. The diffusion sheet 45 may diffuse light guided to the display panel 150 by the light guide plate 50.

A mold frame 30 may be coupled to the receiving container 80 and may support edges of the light guide plate 50 and the sheets 40. In addition, a cover member 20 may be partially opened to expose a display area of the display panel 150 and may cover edges of the display panel 150 while being coupled to the receiving container 80.

Hereinafter, the display panel 150 will be described in detail with reference to FIGS. 2, 3A, and 3B.

Figure 3A:
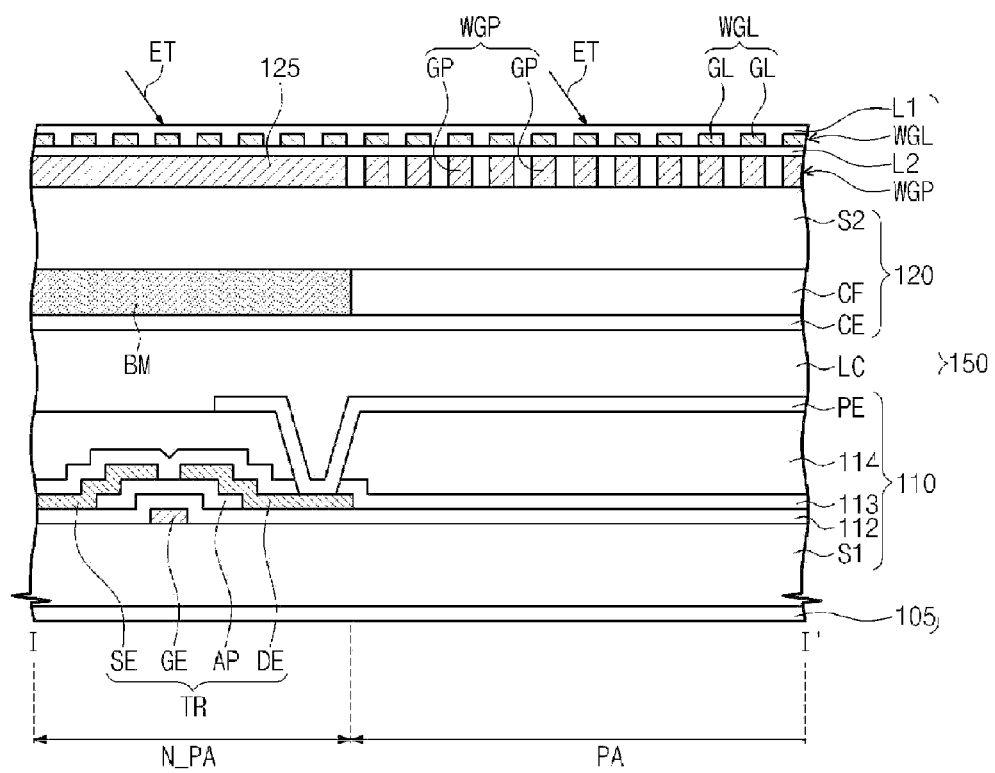
FIG. 3A is a cross-sectional view taken along a line I-I' of FIG. 2 according to exemplary embodiments of the present disclosure.
Figure 3B:
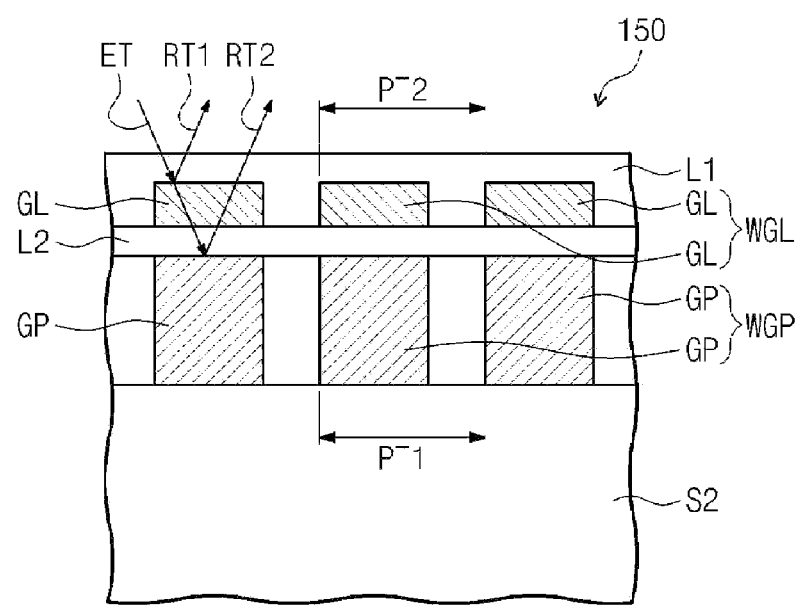
FIG. 3B is an enlarged cross-sectional view showing a reflection reducing layer and a wire grid polarizer of FIG. 3A according to exemplary embodiments of the present disclosure.

FIG. 3A is a cross-sectional view taken along a line I-I' of FIG. 2, and FIG. 3B is an enlarged cross-sectional view showing the reflection reducing layer WGL and the wire grid polarizer WGP of FIG. 3A.

Referring to FIGS. 2, 3A, and 3B, the display substrate 110 may include a first base substrate S1, a thin film transistor TR, and a pixel electrode PE. The first base substrate S1 includes a pixel area PA and a non-pixel area N_PA. The first base substrate S1 may be a glass substrate or a plastic substrate, but is not limited thereto or thereby. When the first base substrate S1 is the plastic substrate, the first base substrate S1 may have a flexible property.

The thin film transistor TR may be disposed in the non-pixel area N_PA. The thin film transistor TR may include a gate electrode GE, an active pattern AP, a source electrode SE, and a drain electrode DE. The gate electrode GE may be electrically connected to a gate line (not shown) and may be disposed on the first base substrate S1. The active pattern AP may be disposed on the gate electrode GE, and a gate insulating layer 112 may be interposed between the gate electrode GE and the active pattern AP.

The active pattern AP may include a semiconductor material, such as amorphous silicon; however, the active pattern AP is not limited thereto or thereby. For example, the active pattern AP may include an oxide semiconductor, such as Indium Gallium Zinc Oxide (IGZO), Zinc Oxide (ZnO), Tin Oxide ($SnO_2$), Indium Oxide ($In_2O_3$), Zinc Tin Oxide ($Zn_2SnO_4$), Germanium Oxide ($Ge_2O_3$), and Hafnium Oxide ($HfO_2$), or a compound semiconductor, such as Gallium Arsenide (GaAs), Gallium Phosphorus (GaP), and Indium Phosphorus (InP).

The source electrode SE may be electrically connected to a data line (not shown) and may be disposed on the active pattern AP. The pixel electrode PE may be disposed in the pixel area PA on an inorganic insulating layer 113 and an organic insulating layer 114, which cover the thin film transistor TR. The pixel electrode PE may be electrically connected to the drain electrode DE through a contact hole formed through the inorganic insulating layer 113 and the organic insulating layer 114. When a gate signal is applied to the gate electrode GE through the gate line to turn on the thin film transistor TR, the data signal, which is applied to the source electrode SE through the data line, may be applied to the pixel electrode PE through the active pattern AP and the drain electrode DE.

The opposite substrate 120 may be disposed farther from the backlight assembly 100 than the display substrate 110. The opposite substrate 120 may include a second base substrate S2, a common electrode CE, a light blocking layer BM, and a color filter CF. The second base substrate S2 may be a transparent substrate, such as a glass substrate, a plastic substrate, etc., and the common electrode CE may be disposed on the second base substrate S2. The liquid crystal layer LC may be interposed between the common electrode CE and the pixel electrode PE facing the common electrode CE. When a differential voltage is applied to the common electrode CE and the pixel electrode PE, an electric field may be generated to control a direction of liquid crystal molecules in the liquid crystal layer LC.

The light blocking layer BM may be disposed on the second base substrate S2 in the non-display area N_PA, and the color filter CF may be disposed on the second base substrate S2 in the pixel area PA. Thus, a portion of the emitted light TL0 emitted from the backlight assembly 100, which travels to the non-pixel area N_PA, may either be blocked by the light blocking layer BM or reflected by the reflection layer 125, and the other portion of the emitted light TL0 from the backlight assembly 100, which travels to the pixel area PA, may be filtered by the color filter CF to attain a desired color.

It should be understood that the display substrate 110 and the opposite substrate 120 are not limited to the above-mentioned structure. For instance, the color filter CF may be disposed on the first base substrate S1 to overlap with the pixel electrode PE, and the common electrode CE may be disposed on the first base substrate S1 to be spaced apart from the pixel electrode PE.

The polarizing plate 105 may be attached to a lower portion of the display substrate 110 to be interposed between the display substrate 110 and the backlight assembly 100. The wire grid polarizer WGP, the reflection reducing layer WGL, and the reflection layer 125 may be disposed on an upper portion of the opposite substrate 120. The reflection reducing layer WGL may be disposed farther from the backlight assembly 100 than the reflection layer 125 and the wire grid polarizer WGP on the opposite substrate 120.

The reflection layer 125 may be disposed on the second base substrate S2 to correspond to the non-display area N_PA. The reflection layer 125 may include aluminum having a reflectivity of about 90%. Thus, a portion of the emitted light LT0 reaching the reflection layer 125 after passing through the display substrate 110 and the opposite substrate 120 may be reflected by the reflection layer 125, and the light reflected by the reflection layer 125 may be reflected again by the reflection member 70 (refer to FIG. 1).

The wire grid polarizer WGP may be disposed on the second base substrate S2 to correspond to the pixel area PA, and the wire grid polarizer WGP may include a plurality of grid polarizing layers GP. The grid polarizing layers GP may include the same light reflection material as the reflection layer 125, e.g., aluminum. The grid polarizing layers GP may extend in a first direction D1 and may be spaced apart from each other in a second direction D2, which is substantially perpendicular to the first direction D1, with a first pitch PT1.

In the wire grid polarizer WGP, when the first pitch PT1 is smaller than a wavelength of the emitted light LT0 incident to the wire grid polarizer WGP, the grid polarizing layers GP may prevent diffraction of the emitted light LT0. The wire grid polarizer WGP may polarize or reflect incident light according to a direction of the emitted light LT0.

In some cases, the wire grid polarizer WGP may allow passage of a P-polarized light among the emitted light LT0 and may reflect an S-polarized light among the emitted light LT0. The S-polarized light reflected by the wire grid polarizer WGP may again be reflected by the reflection member 70 (refer to FIG. 1), and thus a reproducible-emitted light LT1 having another type of P-polarized light and another type of S-polarized light may be generated. The P-polarized light of the reproducible-emitted light LT1 may pass through the wire grid polarizer WGP and may be used to display an image on the display panel 150. According to the optical features of the wire grid polarizer WGP, the above-stated process in which the reproducible-emitted light LT1 is generated from the emitted light LT0 may be repeated, and thus, a utilization efficiency of the emitted light LT0 used to display the image on the display panel 150 may be improved.

The reflection reducing layer WGL may be disposed on the reflection layer 125 and the wire grid polarizer WGP. The reflection reducing layer WGL may be disposed farther from the backlight assembly 100 than the wire grid polarizer WGP, and the wire grid polarizer WGP may be disposed between the reflection reducing layer WGL and the second base substrate S2. Thus, an external light ET may be consecutively provided to the reflection reducing layer WGL and the wire grid polarizer WGP.

The reflection reducing layer WGL may reduce an amount of external light ET reflected by the wire grid polarizer WGP. The reflection reducing layer WGL may include a plurality of grid layers GL. The grid layers GL may extend in the first direction D1 and may be spaced apart from each other in the second direction D2 according to a second pitch PT2.

In some cases, the second pitch PT2 may be the same as the first pitch PT1. In some cases, a width of each of the grid layers GL may be the same as a width of each of the grid polarizing layers GP. The grid layers GL may be disposed to face the grid polarizing layers GP in a one-to-one correspondence relationship in the pixel area PA. A second insulating layer L2 may be interposed between the grid layers GL and the grid polarizing layers GP.

As an example, the second pitch PT2 may be about 10 nanometers to about 250 nanometers, and a ratio of the width of each of the grid layers GL to the second pitch PT2 may be about 1:10 to about 3:10. In a case that the second pitch PT2 is about 100 nanometers, the width of each of the grid layers GL may be of about 10 nanometers to about 30 nanometers. When the second pitch PT2 is about 10 nanometers to about 250 nanometers and the width of each of the grid layers GL is about 1:10 to about 3:10, the reflection reducing layer WGL may prevent the external light ET from being diffracted and be easily formed in terms of manufacturing the reflection reducing layer WGL.

The reflection reducing layer WGL may include a light reflection material having a reflectivity that is lower than a reflectivity of a light reflection material included in the wire grid polarizer WGP. For instance, when the wire grid polarizer WGP includes aluminum having a reflectivity equal to or greater than about 90%, the reflection reducing layer WGL may include at least one of chromium, molybdenum, titanium, tantalum, and tungsten, which has a reflectivity smaller than the reflectivity of the aluminum in the light reflection material of the wire grid polarizer WGP.

The reflection reducing layer WGL may have a thickness of about 10 nanometers to about 100 nanometers. Although the reflection reducing layer WGL includes the light reflection material, a portion of the external light ET reaching the reflection reducing layer WGL may be reflected by the reflection reducing layer WGL and another portion of the external light ET reaching the reflection reducing layer WGL may pass through the reflection reducing layer WGL. That is, the reflection reducing layer WGL may have a transparent property when the thickness of the reflection reducing layer WGL is less than about 10 nanometers; the reflection reducing layer WGL may have a reflective property when the thickness of the reflection reducing layer WGL exceeds about 100 nanometers; and the reflection reducing layer WGL may have a transflective property when the thickness of the reflection reducing layer WGL is about 10 nanometers to about 100 nanometers.

When the reflection reducing layer WGL includes the grid layers GL having the grid shape and the second pitch PT2 of the grid layers GL is of about 10 nanometers to about 250 nanometers, which is smaller than a wavelength of the emitted light LT0 (which may have a visible ray wavelength), the reflection reducing layer WGL may have a similar optical function as the wire grid polarizer WGP. Thus, the reflection reducing layer WGL may prevent the emitted light LT0 from being diffracted, and the reflection reducing layer WGL may pass the P-polarized light together with the wire grid polarizer WGP to secure a brightness of an image displayed on the display panel 150.

In addition, since the second pitch PT2 of the grid layers GL is smaller than the wavelength of the external light ET having a visible ray wavelength, the reflection reducing layer WGL may prevent external light ET from being diffracted and the reflection reducing layer WGL may allow passage of or reflect the external light ET according to a direction of the external light ET. Further, as described earlier, since the reflection reducing layer WGL has a transflective property related to its thickness, a portion of the external light ET reaching the reflection reducing layer WGL may be reflected and another portion of the external light ET reaching the reflection reducing layer WGL may pass through the reflection reducing layer WGL to travel to the wire grid polarizer WGP.

According to the above-described light path with respect to the reflection reducing layer WGL and the wire grid polarizer WGP, the reflection reducing layer WGL may reduce the amount of the light reflected by the wire grid polarizer WGP.

The display panel 150 may further include a first insulating layer L1 and a second insulating layer L2, and the first insulating layer L1 and the second insulating layer L2 may have a light transmissive property. The second insulating layer L2 may be disposed between the wire grid polarizer WGP and the reflection reducing layer WGL. The first insulating layer L1 may cover the reflection reducing layer WGL and may be disposed on an uppermost position of the display panel 150.

The first insulating layer L1 and the second insulating layer L2 may include insulating materials, such as silicon oxide (SiOx), silicon nitride (SiNx), metal oxide, and metal nitride. The metal oxide may be one of titanium oxide (TiOx), molybdenum oxide (MoOx), and aluminum oxide (AlOx), and the metal nitride may be one of titanium nitride (TiNx), molybdenum nitride (MoNx), and aluminum nitride (AlNx).

When external light ET passes through the first insulating layer L1, a portion of the external light ET is reflected by the grid layers GL to generate a first reflected light RT1. In addition, another portion of the external light ET may pass through the grid layers GL and the second insulating layer L2 and may be reflected by the grid polarizing layers GP, to thereby generate a second reflected light RT2.

An amount of the first reflected light RT1 and the second reflected light RT2 may be reduced due to a destructive interference occurring between the first reflected light RT1 and the second reflected light RT2. When the thicknesses of the grid layers GL and the grid polarizing layers GP satisfy the following Equation 1, the amount of the first reflected light RT1 and the second reflected light RT2 may be more effectively reduced due to the destructive interference between the first reflected light RT1 and the second reflected light RT2.

$$(d1+d2) \approx \{(\lambda/4) \times (1/n_1)\} + \{(\lambda/4) \times (1/n_2)\} \qquad \text{Equation 1}$$

In Equation 1, d1 may refer to the thickness of the grid layer GL, d2 may refer to the thickness of the grid polarizing layer GP, $\lambda$ may refer to the wavelength of the external light ET, $n_1$ may refer to a refractive index of the grid layer GL, and $n_2$ may refer to a refractive index of the grid polarizing layer GP.

When a reflection reducing layer WGL is omitted from the display panel 150, the external light ET reflected by the wire grid polarizer WGP may be mixed with the emitted light LT0 used to display the image on the display panel 150, to thereby cause a deterioration of a display quality. According to exemplary embodiments of the present disclosure, the P-polarized light of the emitted light LT0 may pass through the reflection reducing layer WGL after passing through the wire grid polarizer WGP, and thus the brightness of the image displayed on the display panel 150 is not deteriorated. In addition, since an amount of the first reflected light RT1 and the second reflected light RT2 is reduced by the reflection reducing layer WGL, the display quality of the image displayed on the display panel 150 is improved.

Figure 4:
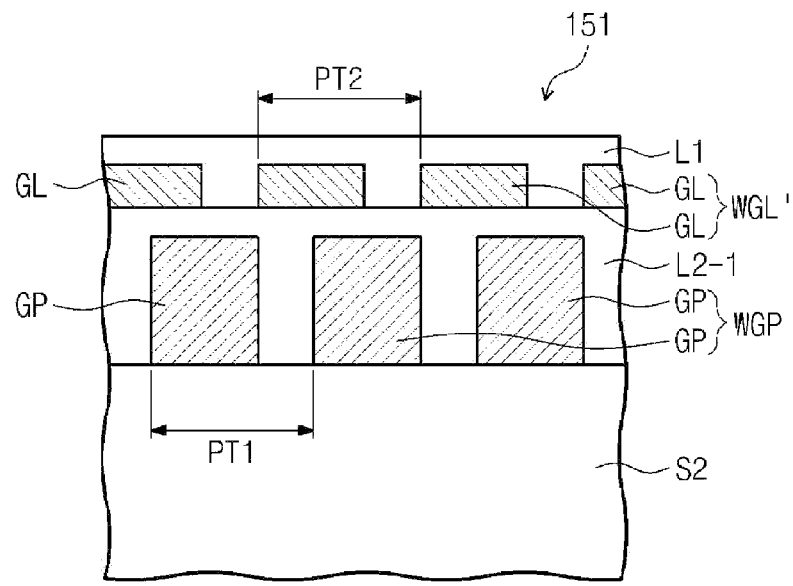
FIG. 4 is an enlarged view showing a portion of a display panel of a display apparatus according to exemplary embodiments of the present disclosure.

FIG. 4 is an enlarged view showing a portion of a display panel 151 of a display apparatus 300 according to exemplary embodiments of the present disclosure. In particular, FIG. 4 shows an enlarged view of a portion of the display panel 151 exposed to an external light. In FIG. 4, the same reference numerals denote the same elements in FIGS. 1, 2, 3A, and 3B, and a detailed descriptions of the same elements in FIG. 4 may be omitted.

Referring to FIG. 4, a display apparatus 300 may include a display panel 151, and the display panel 151 may include a wire grid polarizer WGP, a reflection reducing layer WGL', a first insulating layer L1, and a second insulating layer L2-1 disposed on a second base substrate S2. The wire grid polarizer WGP may include a plurality of grid polarizing layers GP, and the reflection reducing layer WGL' may include a plurality of grid layers GL. The second insulating layer L2-1 may be interposed between the grid layers GL and the grid polarizing layers GP.

The grid polarizing layers GP may be spaced apart from each other according to a first pitch PT1, and the grid layers GL may be spaced apart from each other according to a second pitch PT2. In contrast to FIG. 3B, in FIG. 4, the grid layers GL may not be disposed to correspond to the grid polarizing layers GP. For example, in FIG. 3B, the grid layers GL may have a one-to-one correspondence with the grid polarizing layers GP. In FIG. 4, however, the grid layers GL may not have a one-to-one correspondence with the grid polarizing layers GP.

When the second pitch PT2 is set to be within a range of about 10 nm to about 250 nm, which is smaller than the wavelength of the external light ET, the reflection reducing layer WGL' may allow passage of the P-polarized light of the emitted light LT0 exiting from the wire grid polarizer WGP. Thus, brightness sufficient to display an image on the display panel 151 may be secured even though the grid layers GL may be disposed not to correspond to the grid polarizing layers GP in a one-to-one correspondence. In addition, since the reflection reducing layer WGL' may have a thickness of about 10 nm to about 100 nm to have a transflective property, an amount of reflected light, which is generated when an external light ET is reflected by the wire grid polarizer WGP, may be reduced due to the destructive interference, as described with reference to FIGS. 3A and 3B.

In addition, since the grid layers GL are disposed not to correspond to the grid polarizing layers GP in a one-to-one correspondence, a design margin for the reflection reducing layer WGL' including the grid layers GL increases.

Also, different from the second insulating layer L2 shown in FIGS. 3A and 3B, the second insulating layer L2-1 in FIG. 4 may cover an upper portion of the grid polarizing layers GP and may be disposed between two adjacent grid polarizing layers of the grid polarizing layers GP.

Figure 5:
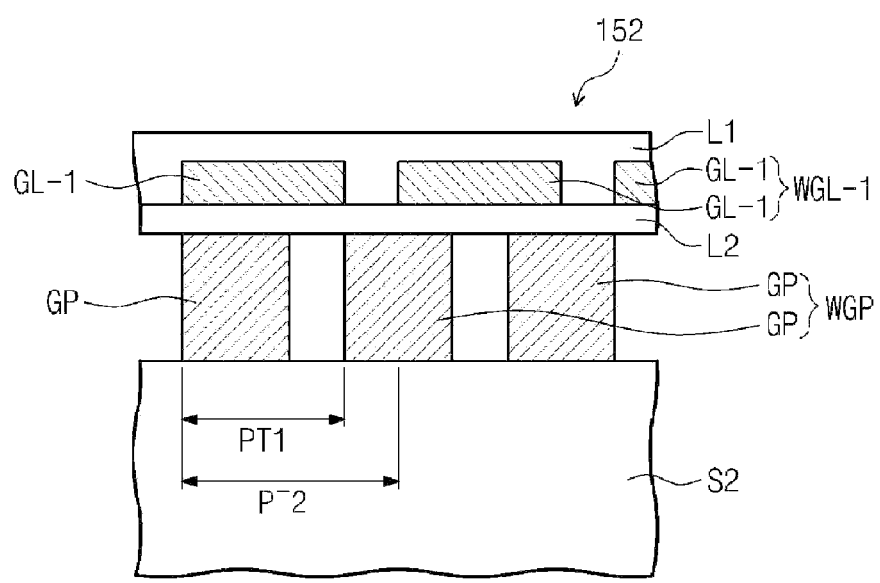
FIG. 5 is an enlarged view showing a portion of a display panel of a display apparatus according to exemplary embodiments of the present disclosure.

FIG. 5 is an enlarged view showing a portion of a display panel 152 of a display apparatus 300 according to exemplary embodiments of the present disclosure. In particular, FIG. 5 shows an enlarged view of a portion of the display panel 152 exposed to an external light. In FIG. 5, the same reference numerals denote the same elements in previous exemplary embodiments, and thus detailed descriptions of the same elements in FIG. 5 may be omitted.

Referring to FIG. 5, a display apparatus 300 may include a display panel 152, and the display panel 152 may include a wire grid polarizer WGP and a reflection reducing layer WGL-1 disposed on a second base substrate S2. The wire grid polarizer WGP may include a plurality of grid polarizing layers GP, and the reflection reducing layer WGL-1 may include a plurality of grid layers GL-1.

The grid polarizing layers GP may be spaced apart from each other according to a first pitch PT1, and the grid layers GL may be spaced apart from each other according to a second pitch PT2', which may be smaller than the first pitch PT1. Therefore, similar to the exemplary embodiment shown in FIG. 4, the grid layers GL-1 may not have a one-to-one correspondence with the grid polarizing layers GP.

When the second pitch PT2' is within a range of about 10 nm to about 250 nm, which is smaller than a wavelength of the external light ET, the reflection reducing layer WGL-1 may allow passage of the P-polarized light of the emitted light LT0 exiting from the wire grid polarizer WGP. Thus, brightness sufficient to display an image on the display panel 152 may be secured even though the first pitch PT1 is different from the second pitch PT2' and the grid layers GL do not correspond to the grid polarizing layers GP in a one-to-one correspondence. In addition, since the reflection reducing layer WGL-1 may have a thickness of about 10 nm to about 100 nm to have a transflective property, an amount of reflected light generated when an external light ET is reflected by the wire grid polarizer WGP may be reduced due to the destructive interference, as described with reference to FIGS. 3A and 3B.

In FIG. 5, the grid layers GL-1 may not have a one-to-one correspondence with the grid polarizing layers GP and may be arranged at a pitch PT2' different from the pitch PT1 of the grid polarizing layers GP, and thus the design margin for the reflection reducing layer WGL-1 including the grid layers GL-1 may increase.

Figure 6A:
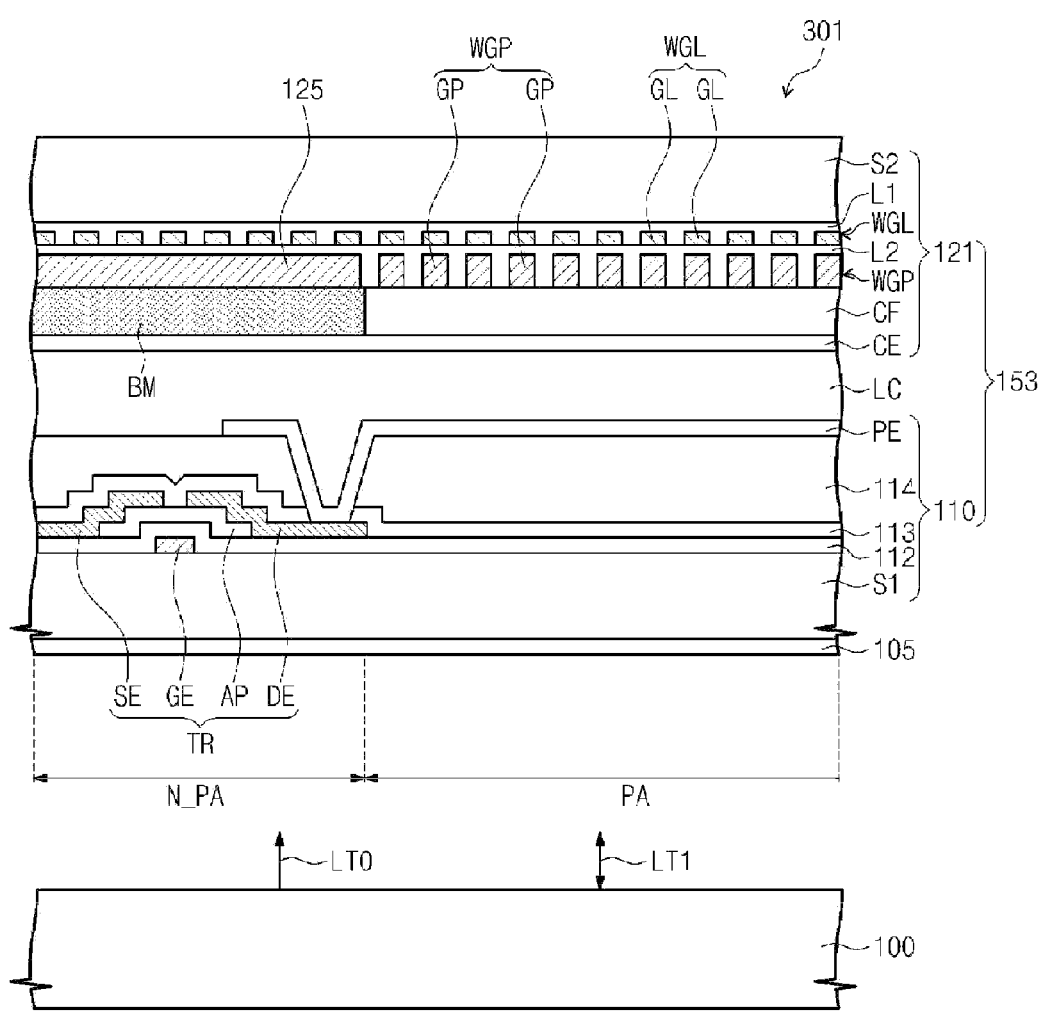
FIG. 6A is a cross-sectional view showing a display apparatus according to exemplary embodiments of the present disclosure.
Figure 6B:
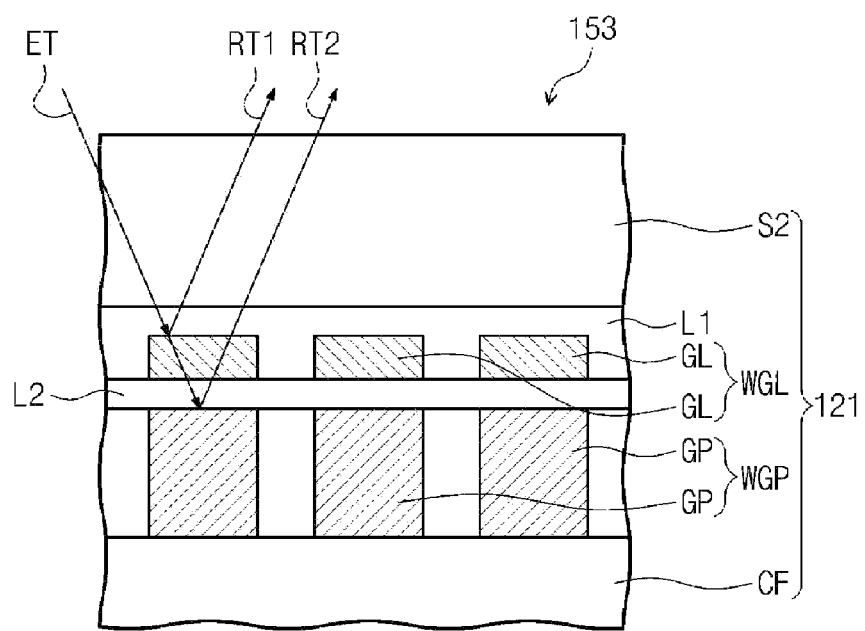
FIG. 6B is an enlarged cross-sectional view showing a portion of a display panel shown in FIG. 6A according to exemplary embodiments of the present disclosure.

FIG. 6A is a cross-sectional view showing a display apparatus 301 according to exemplary embodiments of the present disclosure, and FIG. 6B is an enlarged cross-sectional view showing a portion of a display panel 153 of FIG. 6A. In FIGS. 6A and 6B, the same reference numerals denote the same elements in previous exemplary embodiments, and thus detailed descriptions of the same elements may be omitted.

Referring to FIGS. 6A and 6B, a display apparatus 301 may include a display panel 153 and a backlight assembly 100. The display panel 153 may include a display substrate 110, an opposite substrate 121, a wire grid polarizer WGP, and a reflection reducing layer WGL.

The wire grid polarizer WGP and the reflection reducing layer WGL may be built into the opposite substrate 121. Thus, the reflection reducing layer WGL may be disposed between a second base substrate S2 and the wire grid polarizer WGP, and the second base substrate S2 may be disposed at an outermost portion of the display panel 153 to be exposed to an external light ET.

The external light ET may consecutively pass through the second base substrate S2 and a first insulating layer L1, and a portion of the external light ET may be reflected by the grid layers GL to generate a first reflection light RT1. Another portion of the external light ET may pass through the grid layers GL and a second insulating layer L2 and may be reflected by the grid polarizing layers GP, to thereby generate a second reflection light RT2. The amount of the first reflected light RT1 and the second reflected light RT2 may be reduced by the destructive interference occurring between the first reflected light RT1 and the second reflected light, as described with reference to FIGS. 3A and 3B.

Figure 7:
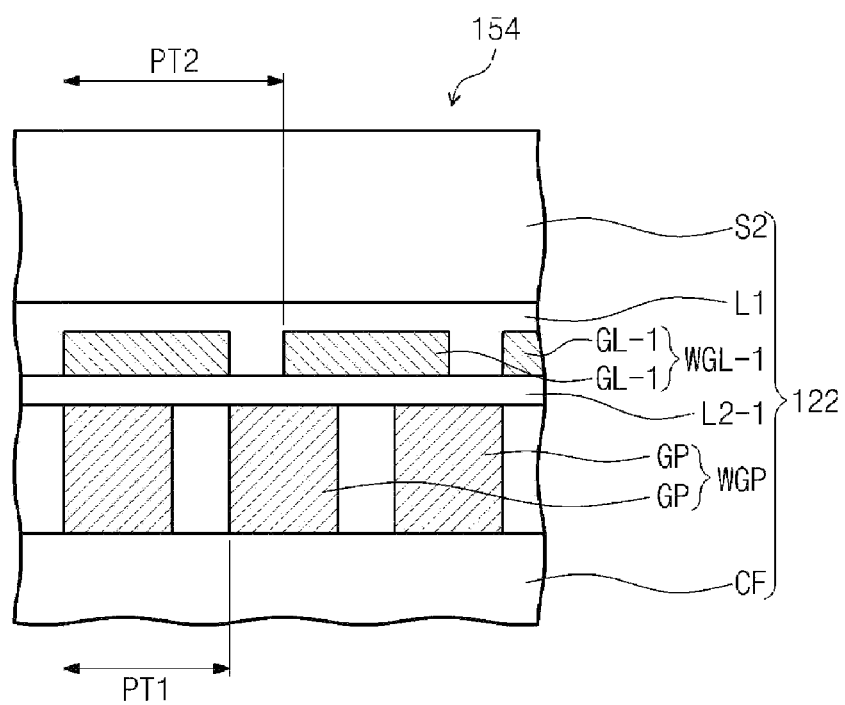
FIG. 7 is an enlarged view showing a portion of a display panel of a display apparatus according to exemplary embodiments of the present disclosure.

FIG. 7 is an enlarged view showing a portion of a display panel 154 of a display apparatus 301 according to exemplary embodiments of the present disclosure. In particularly, FIG. 7 shows an enlarged view of a portion of the display panel 154 exposed to the external light ET. In FIG. 7, the same reference numerals denote the same elements in previous exemplary embodiments, and thus detailed descriptions of the same elements may be omitted.

Referring to FIG. 7, a display apparatus 301 according to the exemplary embodiments may include a display panel 154, and the display panel 154 may include an opposite substrate 122. Similar to the exemplary embodiments shown in FIGS. 6A and 6B, a wire grid polarizer WGP and a reflection reducing layer WGL-1 may be built into the opposite substrate 122. Thus, the reflection reducing layer WGL-1 may be disposed between a second base substrate S2 and the wire grid polarizer WGP, and the second base substrate S2 may be disposed at an outermost portion of the display panel 154 to be exposed to an external light ET.

The wire grid polarizer WGP may include a plurality of grid polarizing layers GP, and the reflection reducing layer WGL may include a plurality of grid layers GL-1. The grid polarizing layers GP may be spaced apart from each other according to a first pitch PT1, and the grid layers GL-1 may be spaced apart from each other according to a second pitch PT2' that is greater than the first pitch PT1. As a result, similar to the exemplary embodiment shown in FIG. 4, the grid layers GL-1 may not be disposed in a one-to-one correspondence with the grid polarizing layers GP.

When the second pitch PT2' is within a range of about 10 nm to about 250 nm, which is smaller than a wavelength of the external light ET, the reflection reducing layer WGL-1 may allow passage of a P-polarized light of an emitted light LT0 exiting from the wire grid polarizer WGP. Thus, brightness sufficient to display an image on the display panel 154 may be secured even though the first pitch PT1 is different from the second pitch PT2', and the grid layers GL may not be disposed in a one-to-one correspondence with the grid polarizing layers GP. In addition, since the reflection reducing layer WGL-1 may have a thickness of about 10 nm to about 100 nm to have a transflective property, the amount of reflected light reflected by the wire grid polarizer WGP may be reduced due to destructive interference.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A display apparatus, comprising:
a backlight assembly configured to emit light; and
a display panel configured to receive the emitted light to display an image, the display panel comprising:
a display substrate;
an opposite substrate facing the display substrate;
a wire grid polarizer disposed on at least one of the display substrate and the opposite substrate to polarize the emitted light; and
a reflection reducing layer having a grid shape and being disposed on the wire grid polarizer to reduce an amount of a reflected light, the reflected light being generated in response to external light being reflected by the wire grid polarizer,
wherein the wire grid polarizer comprises a plurality of grid polarizing layers spaced apart from each other, each of the plurality of grid polarizing layers extending in a first direction,
wherein a ratio of a width of each of the plurality of grid layers to the pitch of the grid layers is in a range of about 1:10 to about 3:10, and
wherein the reflection reducing layer comprises a plurality of grid layers spaced apart from each other, each of the plurality of grid layers extending in the first direction,
wherein a thickness of the grid layers and a thickness of the grid polarizing layers are obtained using an Equation $$d1+d2 \approx \{(\lambda/4) \times (1/n_1)\} + \{(\lambda/4) \times (1/n_2)\},$$

wherein d1 denotes the thickness of the grid layers, d2 denotes the thickness of the grid polarizing layers, $\lambda$ denotes a wavelength of the external light, $n_1$ denotes a refractive index of the grid layers, and $n_2$ denotes a refractive index of the grid polarizing layers.

2. The display apparatus of claim 1, wherein the reflection reducing layer is configured to reduce the amount of the reflected light via destructive interference between the reflected light and a second reflected light generated in response to the external light being reflected by the reflection reducing layer.

3. The display apparatus of claim 2, wherein the reflection reducing layer comprises a transflective property.

4. The display apparatus of claim 3, wherein the reflection reducing layer comprises a thickness in a range of about 10 nm to about 100 nm.

5. The display apparatus of claim 1, wherein a pitch of the grid layers is smaller than a wavelength of the external light.

6. The display apparatus of claim 5, wherein the pitch of the grid layers is in a range of about 10 nm to about 250 nm.

7. The display apparatus of claim 5, wherein a pitch of the grid polarizing layers is the same as the pitch of the grid layers.

8. The display apparatus of claim 5, wherein the pitch of the grid polarizing layers is different from the pitch of the grid layers.

9. The display apparatus of claim 5, wherein the grid polarizing layers are disposed in a pixel area of the display panel, and the grid polarizing layers are disposed to correspond to the grid layers in a one-to-one correspondence.

10. The display apparatus of claim 2, wherein the wire grid polarizer comprises a light reflection material having a first reflectivity, and the reflection reducing layer comprises a light reflection material having a second reflectivity smaller than the first reflectivity.

11. The display apparatus of claim 10, wherein the wire grid polarizer comprises aluminum, and the reflection reducing layer comprises at least one of chromium, molybdenum, titanium, tantalum, and tungsten.

12. The display apparatus of claim 1, wherein:
the opposite substrate is disposed farther from the backlight assembly than the display substrate;
the reflection reducing layer is disposed farther from the backlight assembly than the wire grid polarizer; and
the external light is provided to the wire grid polarizer after passing through the reflection reducing layer.

13. The display apparatus of claim 12, wherein the wire grid polarizer is disposed between a base substrate of the opposite substrate and the reflection reducing layer.

14. The display apparatus of claim 12, wherein the wire grid polarizer and the reflection reducing layer are built into the opposite substrate, and the reflection reducing layer is disposed between a base substrate of the opposite substrate and the wire grid polarizer.

15. The display apparatus of claim 1, wherein the display panel further comprises:
a first insulating layer having a light transmissive property and covering the reflection reducing layer; and
a second insulating layer disposed between the wire grid polarizer and the reflection reducing layer and covering the wire grid polarizer.

16. The display apparatus of claim 15, wherein:
the grid polarizing layers are disposed in a pixel area of the display panel, the grid polarizing layers not being in a one-to-one correspondence with the grid layers; and
the second insulating layer is disposed between the grid polarizing layers and the grid layers.

17. The display apparatus of claim 1, wherein the display panel further comprises a liquid crystal layer disposed between the display substrate and the opposite substrate.

* * * * *